Sept. 29, 1959

LEISER BERGSTEIN
NOW BY CHANGE OF NAME
LEONARD BERGSTEIN
VARIFOCAL LENS SYSTEM 2,906,171

Filed Dec. 20, 1955

INVENTOR:
L. BERGSTEIN

BY

*Karl F. Ross*

AGENT

Sept. 29, 1959

LEISER BERGSTEIN
NOW BY CHANGE OF NAME
LEONARD BERGSTEIN
VARIFOCAL LENS SYSTEM 2,906,171

Filed Dec. 20, 1955

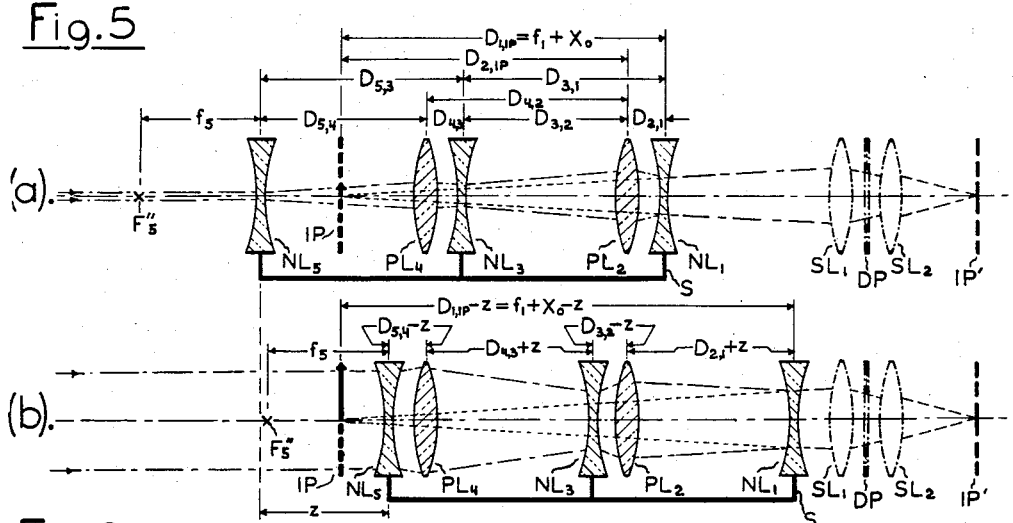

Fig. 6

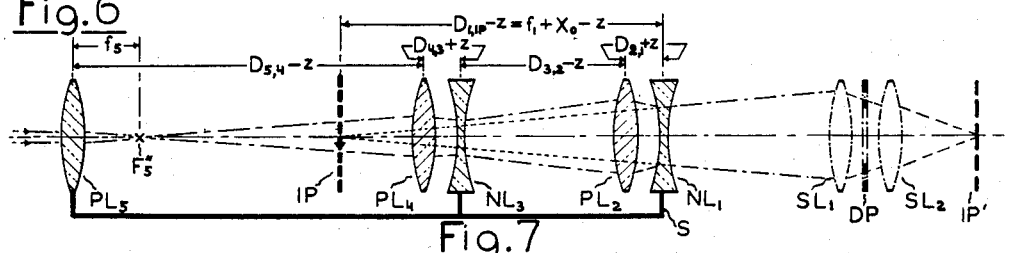

Fig. 7

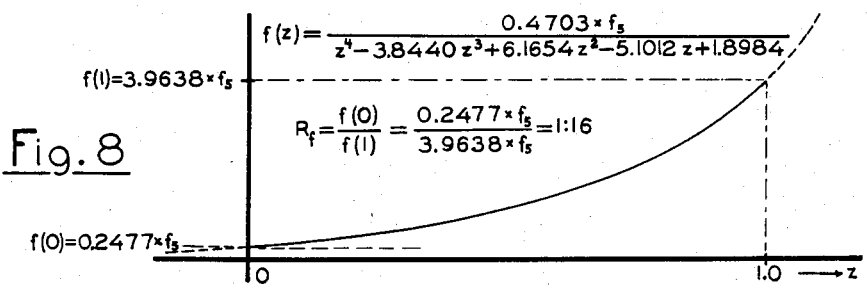

| FOCAL LENGTHS | SEPARATIONS | FIXED SEPARATIONS |
|---|---|---|
| $f_5$ = arbitrary | $D_{5,4}(z) = D_{5,4} - z$ = variable from $[3.7375 + f_5]$ to $[2.7375 + f_5]$ | $D_{5,3} = 3.8201 + f_5$ |
| $f_4 = +1.1927$ | $D_{4,3}(z) = D_{4,3} + z$ = variable from 0.0826 to 1.0826 | $D_{3,1} = 1.1891$ |
| $f_3 = -0.5761$ | $D_{3,2}(z) = D_{3,2} - z$ = variable from 1.0891 to 0.0891 | |
| $f_2 = +0.8556$ | $D_{2,1}(z) = D_{2,1} + z$ = variable from 0.1000 to 1.1000 | $D_{4,2} = 1.1717$ |
| $f_1 = -0.8000$ | $D_{1,IP}(z) = D_{1,IP} - z$ = variable from $-1.8440$ to $-2.8440$ | $D_{2,IP} = -1.7440$ |

Fig. 8

$$f(z) = \frac{0.4703 \times f_5}{z^4 - 3.8440 z^3 + 6.1654 z^2 - 5.1012 z + 1.8984}$$

$f(1) = 3.9638 \times f_5$ $$R_f = \frac{f(0)}{f(1)} = \frac{0.2477 \times f_5}{3.9638 \times f_5} = 1:16$$

$f(0) = 0.2477 \times f_s$

Fig. 9

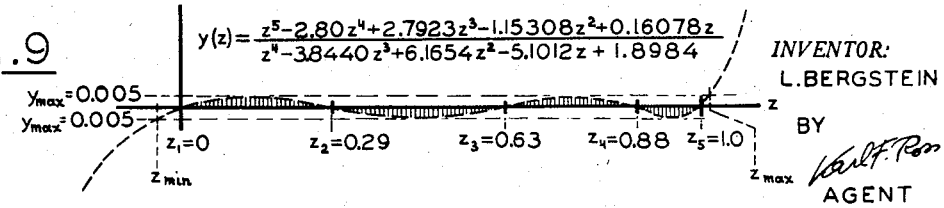

$$y(z) = \frac{z^5 - 2.80 z^4 + 2.7923 z^3 - 1.15308 z^2 + 0.16078 z}{z^4 - 3.8440 z^3 + 6.1654 z^2 - 5.1012 z + 1.8984}$$

$y_{max} = 0.005$
$y_{max} = 0.005$ $z_1 = 0$   $z_2 = 0.29$   $z_3 = 0.63$   $z_4 = 0.88$   $z_5 = 1.0$
$z_{min}$                                          $z_{max}$

INVENTOR:
L. BERGSTEIN
BY
AGENT

Sept. 29, 1959

LEISER BERGSTEIN
NOW BY CHANGE OF NAME
LEONARD BERGSTEIN
VARIFOCAL LENS SYSTEM 2,906,171

Filed Dec. 20, 1955

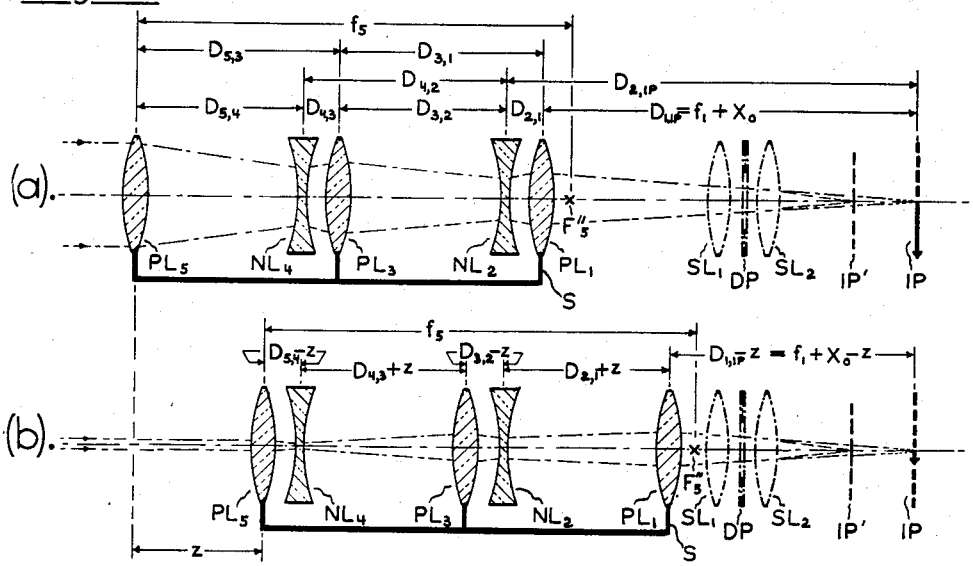

Fig.11

| FOCAL LENGTHS | SEPARATIONS | | FIXED SEPARATIONS |
|---|---|---|---|
| $f_5$ = arbitrary | $D_{5,4}(z) = D_{5,4} - z$ = variable from $[f_5 - 2.1924]$ to $[f_5 - 3.1924]$ | | $D_{5,3} = f_5 - 2.1157$ |
| $f_4 = -0.9054$ | | | |
| $f_3 = +0.8911$ | $D_{4,3}(z) = D_{4,3} + z$ = variable from 0.0767 | to 1.0767 | $D_{3,1} = 1.2541$ |
| $f_2 = -0.5361$ | $D_{3,2}(z) = D_{3,2} - z$ = variable from 1.1541 | to 0.1541 | $D_{4,2} = 1.2308$ |
| $f_1 = +1.1000$ | $D_{2,1}(z) = D_{2,1} + z$ = variable from 0.1000 | to 1.1000 | $D_{2,IP} = 3.5150$ |
| | $D_{1,IP}(z) = D_{1,IP} - z$ = variable from 3.4150 | to 2.4150 | |

Fig.12

$$f(z) = \frac{0.4758 \times f_5}{z^4 + 0.1150 z^3 + 0.6485 z^2 + 0.3771 z + 0.1427}$$

$f(0) = 3.3343 \times f_5$ $$R_f = \frac{f(0)}{f(1)} = \frac{3.3343 \times f_5}{0.2084 \times f_5} = 16:1$$

$f(1) = 0.2084 \times f_5$

Fig.13

$$y(z) = \frac{z^5 - 2.20 z^4 + 1.5923 z^3 - 0.42382 z^2 + 0.03152 z}{z^4 + 0.1150 z^3 + 0.6485 z^2 + 0.3771 z + 0.1427}$$

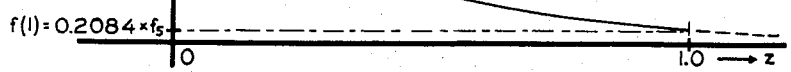

$y_{max} = 0.0047$
$y_{max} = 0.0047$ $z_1 = 0$  $z_2 = 0.12$  $z_3 = 0.37$  $z_4 = 0.71$  $z_5 = 1.0$
$z_{min}$                                              $z_{max}$ INVENTOR:
L. BERGSTEIN
BY Karl F. Ross
AGENT

2,906,171

VARIFOCAL LENS SYSTEM

Leiser Bergstein, Brooklyn, N.Y., now by change of name Leonard Bergstein

Application December 20, 1955, Serial No. 554,287

3 Claims. (Cl. 88—57)

My present invention relates to a varifocal lens system adapted to be used either by itself or as an attachment for photographic objectives, telescopes and the like.

Varifocal systems are known which enable the changing of the focal length and, thereby, of the angle of view of a photographic objective by a relative displacement of certain lens elements thereof. Unfortunately, however, this effect is always accompanied by a displacement of the image produced by the optical system which will make the same unusable if no compensation for image shift is provided. Earlier systems utilized mechanical means for such compensation. The method used consists in imparting two or more coordinated movements to the elements of the system; these movements are interrelated according to a non-linear law, thus necessitating comparatively complicated cam controls or the like which render the assembly bulky and unsatisfactory from the viewpoints of both the manufacturer and the user. Another, more recent attempt at solving the problem involved the use of a three-lens system wherein a movable front lens is followed by a stationary intermediate lens, the latter in turn preceding a movable rear lens coupled with the front lens. The position and the focal length of the movable rear lens are so chosen that, as the two interconnected lenses are moved to change the image size or angle of view of the system, three positions stand out in which the deviation of the image plane from a predetermined location is zero; at intermediate positions of adjustment this deviation is relatively small. With only three points of exact image shift compensation, however, these systems are restricted to a rather narrow operative range of focal-length variations, the maximum attainable ratio between the longest and the shortest overall focal length being about 3:1 if the aforementioned deviation is not to exceed tolerable limits. Even with this restricted range it is not possible to reduce the maximum image-plane deviation at intermediate points below a value of the order of 1.5 to 2% of the shortest overall focal length.

Another shortcoming of these prior systems is that they require a large diameter for their front component in order to avoid vignetting. Furthermore it has been found impossible to correct such systems for spherical and chromatic aberrations, astigmatism and field curvature throughout their operative range.

The broad object of my present invention is to provide an optical system of simple construction adapted to maintain a substantially fixed image-plane position over a considerable range of focal lengths.

Another object of my present invention is to provide a relatively compact optical system of the character set forth wherein the range of variations of its focal length is markedly greater than in comparable systems of the prior art.

A further object of my present invention is to provide an optical system of this kind which, when used in conjunction with a photographic camera or the like, can be focused for distance selection by the movement of a single component thereof.

A more specific object of my present invention is to provide a multi-component varifocal optical system with four or more points of exact image shift compensation, i.e. zero deviation of the back focus from a predetermined position, along with negligible variations of the back-focal position at intermediate points of overall-focus adjustment, for any desired range of focal lengths.

Generally, a varifocal system in accordance with this invention comprises four or more components (which may be single lenses or combinations of air-spaced or cemented lens elements) including a first, movable rear component at the image side of the system (which in turn may precede one or more fixed lens elements not included in the varifocal system proper), a fixed second component ahead of this fixed component, a movable third component preceding said fixed second component, and one or more alternately fixed and movable components positioned forwardly of said third component at the object side of the system; all the movable components are ganged together for simultaneous displacement relative to all the fixed components. For convenience, the fixed components will be referred to as the stationary set and the other components as the movable set.

In the following detailed description, as in the brief outline given above, the numerical designations of the lens elements or objective components will always be chosen in ascending order from the image side to the object side; while this is contrary to conventional procedure, I have adopted this method because it enables me to arrive at a generalized analytical treatment of my varifocal system irrespectively of the number of components thereof. Thus, the even-numbered components will always be stationary and the odd-numbered components will form part of the movable set.

Consider Newton's image equation $$v_k = -f_k^2/u_k \qquad (1)$$

wherein, in a system of $n$ components, $k$ is an integer between 1 and $n$ inclusive, $f_k$ is the principal focal length of the $k$th component, $u_k$ is the object distance of such component (measured from the primary focal point thereof) and $v_k$ is its image distance (measured from the secondary focal point of the component). Let $d_{k,k-1}$ be the distance from the secondary focal point $f_k''$ of the $k$th component to the primary focal point $F_{k-1}'$ of the $(k-1)$th component, which may be either positive (if $F''_k$ is in front of $F'_{k-1}$) or negative (if $F''_k$ is behind $F'_{k-1}$). Then, using Conrady's sign convention for object and image distances $$u_{k-1} = -(d_{k,k-1} - v_k) \qquad (2)$$

If these Equations 1 and 2 are written for all the consecutive elements, starting from the first element on the object side, i.e. (for an object at infinity) $u_n = \infty$, $v_n = 0$, $u_{n-1} = -d_{n,n-1}$, $v_{n-1} = -f^2_{n-1}/u_{n-1}$, etc. then $v_1 \equiv x$ will represent the distance between the image plane of the system and the secondary focal point of the movable first (rearmost) component.

As the relative spacing between the fixed and the movable components is varied, the overall focal length of the system changes but the image plane shifts also from its original or zero position. Let $z$ be the increment in relative spacing, ranging between zero and a maximum or near-maximum value $z_n$ which denotes the ultimate position in which full compensation occurs (as hereinafter described) and which for convenience will be equated to unity in the mathematical analysis to follow. If $\pm y$ be the aforementioned shift of the image plane, or image deviation, then $$y = x - (x_0 - z) \qquad (3)$$

wherein $x_0$ represents the image distance $v_1$ in a reference position of the varifocal system in which $z=0$ and $y=0$.

Upon introducing the increment $z$ in Equation 2, we obtain $$u_{k-1} = -d_{k,k-1} + v_k - (-1)^k z \qquad (4)$$

whence, by a development of Equation 1, the following expression for the image distance $x$ as a function of $z$ can be derived:

$$x = f_1^2 \frac{z^{n-2} + c_1 z^{n-3} + \ldots + c_{n-3} z + c_{n-2}}{z^{n-1} + b_1 z^{n-2} + \ldots + b_{n-2} z + b_{n-1}} \qquad (5)$$

wherein $b_m$, a generalized form of the coefficients in the denominator, and $c_m$, a generalized form of the coefficients in the numerator, have the following values (for $n=5$):

$$b_1 = d_{2,1} - d_{3,2} + d_{4,3} - d_{5,4}$$
$$b_2 = -d_{2,1}d_{3,2} + d_{2,1}d_{4,3} - d_{3,2}d_{4,3} - d_{2,1}d_{5,4}$$
$$+ d_{3,2}d_{5,4} - d_{4,3}d_{5,4} + f_2^2 + f_3^2 + f_4^2$$
$$b_3 = -d_{2,1}d_{3,2}d_{4,3} + d_{2,1}d_{3,2}d_{5,4} - d_{2,1}d_{4,3}d_{5,4} + d_{3,2}d_{4,3}d_{5,4}$$
$$+ f_2^2 d_{4,3} + f_3^2 d_{2,1} + f_4^2 d_{3,2} + f_2^2 d_{5,4} + f_3^2 d_{5,4} + f_4^2 d_{2,1}$$
$$b_4 = d_{2,1}d_{3,2}d_{4,3}d_{5,4} + f_2^2 d_{4,3} d_{5,4} + f_3^2 d_{2,1} d_{5,4} + f_4^2 d_{2,1} d_{3,2}$$
$$c_1 = -d_{3,2} + d_{4,3} - d_{5,4}$$
$$c_2 = -d_{3,2}d_{4,3} + d_{3,2}d_{5,4} - d_{4,3}d_{5,4} + f_3^2 + f_4^2$$
$$c_3 = d_{3,2}d_{4,3}d_{5,4} + f_4^2 d_{3,2} + f_3^2 d_{5,4}$$
$$c_4 = 0 \qquad (5a)$$

A convenient parameter transformation $$d_{k,k-1} \equiv w_{k-1}$$
$$f_k^2 \equiv g^2_{k,k-1} \qquad (5b)$$

enables us to rewrite Equations 5a as follows:

$$b_1 = w_1 - w_2 + w_3 - w_4$$
$$b_2 = -w_1 w_2 + w_1 w_3 - w_2 w_3 - w_1 w_4$$
$$+ w_2 w_4 - w_3 w_4 + g^2_{2,1} + g^2_{3,2} + g^2_{4,3}$$
$$b_3 = -w_1 w_2 w_3 + w_1 w_2 w_4 - w_1 w_3 w_4 + w_2 w_3 w_4 + g^2_{2,1} w_3$$
$$+ g^2_{3,2} w_1 + g^2_{4,3} w_2 + g^2_{2,1} w_4 + g^2_{3,2} w_4 + g^2_{4,3} w_1$$
$$b_4 = w_1 w_2 w_3 w_4 + g^2_{2,1} w_3 w_4 + g^2_{3,2} w_1 w_4 + g^2_{4,3} w_1 w_2$$
$$c_1 = -w_2 + w_3 - w_4$$
$$c_2 = -w_2 w_3 + w_2 w_4 - w_3 w_4 + g^2_{3,2} + g^2_{4,3}$$
$$c_3 = w_2 w_3 w_4 + g^2_{4,3} w_2 + g^2_{3,2} w_4$$
$$c_4 = 0 \qquad (5c)$$

We can now state, generally, that $b_m$ is the algebraic sum of all the products, of $m$th degree, of all the parameters $(-1)^k w_{k-1}$ and $g^2_{k,k-1}$ with the exception of $g^2_{n,n-1}$ and that $c_m$ is equal to $b_m$ except for the exclusion of $w_1$ and $g^2_{2,1}$, subject to the limitation that no term is to include any subscript more than once. For $z=0$, Equation 5 yields $$x_0 = f_1^2 c_{n-2} b_{n-1} \qquad (6)$$

whence, in conjunction with Equations 3 and 5

$$y = \frac{z^n + a_1 z^{n-1} + a_2 z^{n-2} + \ldots + a_{n-1} z}{z^{n-1} + b_1 z^{n-2} + \ldots + b_{n-2} z + b_{n-1}} \qquad (7)$$

wherein the generalized form $a_m$ of the coefficients in the numerator is given by the expression $$a_m = b_m - x_0 b_{m-1} + f_1^2 c_{m-2} \qquad (8)$$

Since an algebraic equation of $n$th degree has $n$ roots, which by proper choice of parameters can all be made real, Equation 7 can also be written in the form $$y = \frac{(z-z_1)(z-z_2) \ldots (z-z_n)}{z^{n-1} + b_1 z^{n-2} + \ldots b_{n-2} z + b_{n-1}} \qquad (9)$$

wherein $z_i = z_1, z_2 \ldots z_n$ are the $n$ roots of the equation for $y=0$ which, in accordance with my invention, can be so determined as to give $n$ points of full compensation all within the operative range of the $n$-element varifocal system by being all real and positive within the limits 0 and 1, inclusive.

From a comparison of Equations 7 and 9 it is seen that the generalized coefficient $a_m$ may be expressed by the formula $$a_m = \sum_i \pi_m(-z_i) \qquad (10)$$

whose right-hand side denotes the sum of all cross-products of $m$ roots, each root being multiplied by $-1$; thus, considering that $z_1 = 0$ and $z_n = 1$ $$a_1 = -z_2 - z_3 - \ldots - z_{n-1} - 1$$
$$a_2 = z_2 z_3 + z_2 z_4 + \ldots + z_{n-1}$$
$$a_3 = -z_2 z_3 z_4 - \ldots - z_{n-2} z_{n-1}$$
$$\ldots \ldots \ldots \ldots \ldots \ldots \ldots$$
$$a_{n-1} = (-1)_{n-1} z_2 z_3 z_4 \ldots z_{n-1} \qquad (10a)$$

The points $z_2 \ldots z_{n-1}$ of full compensation may be selected arbitrarily, preferably in such manner as at least approximately to equalize the absolute values of the maxima of the deviation function $y(z)$, or of the ratio $y(z)/f(z)$, occurring between points of full compensation; $f(z)$ is the overall focal length of the system, expressed as a function of the displacement $z$. From the chosen points of full compensation $z_2$, $z_3$ etc. the parameters $a_m$ may be obtained directly by means of Equations 10a. If on the left-hand sides of these latter equations the parameters $d_{k,k-1}$ and $f_k^2$ are introduced in place of the coefficients $a_m$, pursuant to Equations 5a and 8, we arrive at $(n-1)$ equations for $(2n-2)$ unknown variables, i.e. for the $(n-1)$ spacing $d_{2,1}$ etc. and for the $(n-1)$ focal lengths $f_1 \ldots f_{n-1}$.

The overall focal length $f$ of the system is given, on the basis of Equations 1 and 2, by the expression $$f = \frac{f_1(-f_2)f_3(-f_4)f_5 \ldots (-1)^{n-1}f_n}{z^{n-1} + b_1 z^{n-2} + \ldots b_{n-2} z + b_{n-1}} \qquad (11)$$

This overall focal length changes between a value $f(0)$, for $z=0$, and $f(1)$, for $z=1$. The ratio $R_f$ of these two values is then found to be $$R_f \equiv f(0)/f(1) = \frac{1 + b_1 + b_2 + \ldots + b_{n-1}}{b_{n-1}} \qquad (12)$$

A desired value of the operative range represented by $R_f$ thus yields one further equation for the aforementioned parameters. This leaves $(n-2)$ parameters freely selectable within certain limits derived from geometrical considerations. Thus, it appears from Equation 4 that the value of $z$ is to be added to the spacings $d_{2,1}$, $d_{4,3}$ etc. but is to be subtracted from the spacings $d_{3,2}$, $d_{5,4}$ etc. In the light of our normalization $z_n = 1$ (i.e. $0 \leq z \leq 1$) and of the assumption that each component of the system can be regarded as a thin lens, we can write, therefore, the following inequations for the lens spacing $D_{k,k-1} = f_{k,k-1} + f_{k-1}$ in the original position of the movable set ($z=0$):

$$D_{k,k-1} > 1 \quad (k=3, 5, 7 \text{ etc.}) \qquad (13a)$$

$$D_{k,k-1} > 0 \quad (k=2, 4, 6 \text{ etc.}) \qquad (13b)$$

There are $(n-1)$ such inequations of which the last one (for $k=n$) introduces the focal length $f_n$ of the front component as a new variable. Our aforementioned $(2n-2)$ variables can thus be determined from a total of $(2n-2)$ equations and inequations. Although inequations (13a) and (13b) specify only a lower limit, it will generally be desirable to adhere as closely as possible to this limit in order to arrive at a compact assembly consisting of low-power individual components. In like manner it will be possible to determine $f_n$ from the value of $D_{n,n-1}$ specified by inequation (13a) or (13b), taking into account the desired overall focal length $f(0)$ of the system.

Thus, for any desired operative range $R_f$ we may, on the basis of the total $2n-2$ equations and inequalities, design an $n$-element varifocal lens system whose maximum image deviation, within its range, will not exceed a prescribed limit. An increase in the number of components and, thus, in the number of points of full compensation from $n$ to $(n+1)$ will decrease the maximum image deviation at the intermediate points by a factor of ten or higher.

It may be mentioned that the system as a whole may be either positively or negatively refracting and that the final image formed may be real or virtual, inverted or upright. If the system is positively refracting, i.e. has a real final image, it will have its maximum focal length in the front position ($z=0$) of the movable set, hence $f_{max}=f(0)$, whereas a negatively refracting system, i.e. one having a virtual final image, will have its maximum focal length at the rear position ($z=1$) of the movable set, hence $f_{max}=f(1)$. If we assume, for example, an operative range of 16:1, the focal-length ratio $R_f$ may be expressed either as a fraction, i.e. $R_f=1/16$ since $f(0)/f(1)<1$ in a negatively refracting system, or as an integer, i.e. $R_f=16$, since $f(0)/f(1)>1$ in a positively refracting system.

The system may also be supplemented by any conventional lens system for the purpose of inversion, change in magnification and/or production of a real image. If the supplemental lens system has a magnification factor M, then the focal length of the entire system will be $Mf(z)$ and the image deviation will be $M^2y(z)$, no other changes occurring in the performance of the system. The diaphragm space, in the case of a photographic objective or the like, may be positioned immediately back of the rear member of the varifocal assembly or may be separated therefrom by one or more components of a supplemental system or the type referred to.

In the foregoing analysis it has been assumed that the object is at infinity, the image distance $v_n$ of the front component of the system being thus zero. The object distance $u_{n-1}$ of the component immediately following this front component was then given as $-d_{n,n-1}$, this relationship following directly from Equation 2. For an object at a finite distance the value of $v_n$ becomes likewise finite; yet if $d_{n,n-1}$ is altered so that $u_{n-1}$ remains unchanged, none of the other parameters of the system will be affected and the values of $x$ and $y$ will remain unaltered. It will thus be seen that a displacement of the front component, to vary the distance between its secondary focal point and the primary focal point of the next component, will enable the system to be focused upon any object without a shift in the position of the image plane.

The invention will be more fully understood from the following detailed description of certain embodiments, reference being made to the accompanying drawing in which.

Fig. 5($a$) and ($b$) shows, in two different positions, a varifocal system according to the invention composed of five alternately negative and positive lens members;

Fig. 6 shows a system similar to that of Fig. 5 but with the negative front component thereof replaced by a positive lens member;

Fig. 7 is a table listing the common parameters of the systems of Figs. 5 and 6;

Fig. 8 is a graph for $f(z)$ as applied to the systems of Figs. 5 and 6;

Fig. 9 is a graph for $y(z)$ as applied to the systems of Figs. 5 and 6;

Figs. 10($a$) and ($b$) shows, in two different positions, a system similar to that of Fig. 5 but with the positions of the positive and negative lens members interchanged;

Fig. 11 is a table listing the parameters of the system of Fig. 10;

Fig. 12 is a graph for $f(z)$ as applied to the system of Fig. 10; and

Fig. 13 is a graph for $y(z)$ as applied to the system of Fig. 10.

Figure 1:
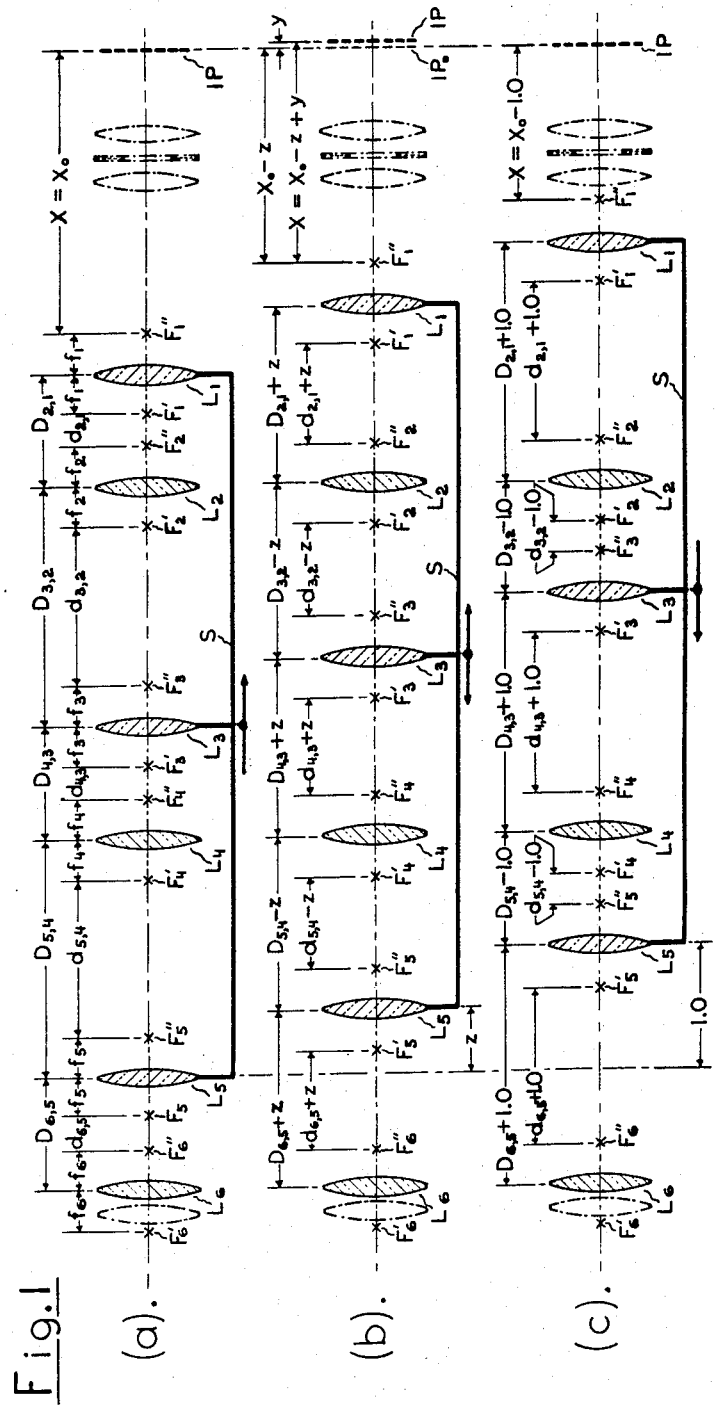
Fig. 1 illustrates schematically, in graphs $(a)$, $(b)$ and $(c)$ thereof, three different positions of a six-component varifocal system embodying the invention, the individual components having all been shown as positive lenses merely by way of a generalized representation.

In Fig. 1 I have shown schematically a system of six components $L_1$, $L_2$, $L_3$, $L_4$, $L_5$ and $L_6$ (numbered in ascending order from right to left), each shown as a simple positive lens; it will be understood, however, that one or more of these components could also be compound lenses or lens combinations, in order to correct aberrations, and that some of them could be negatively refracting as illustrated for a five-lens system in Figs. 5, 6 and 10. The even-numbered lenses $L_2$, $L_4$, $L_6$ are stationary while the odd-numbered lenses $L_1$, $L_3$, $L_5$ are movable and are interconnected by a shift mechanism S for simultaneous displacement.

The image plane of the system is shown at IP, its distance from the secondary focal point $F_{1''}$ of the rearmost lens $L_1$ being designated $x$. Fig. 1$a$ also shows the parameters $d_{2,1}$, measured between the secondary focal point $F_{2''}$ of lens $L_2$ and the primary focal point $F_{1'}$ of lens $L_1$; $d_{3,2}$, measured in analogous manner between focal points $F_{3''}$ of lens $L_3$ and $F_{2'}$ of lens $L_2$; $d_{4,3}$, between focal points $F_{4''}$ and $F_{3'}$ of lenses $L_4$ and $L_3$, respectively; $d_{5,4}$, between focal points $F_{5''}$ and $F_{4'}$; and $d_{6,5}$, between focal points $F_{6''}$ and $F_{5'}$. The primary focal point of the front component $L_6$ is shown at $F_{6'}$.

Also shown in Fig. 1($a$) are the focal lengths $f_1$, $f_2$, $f_3$, $f_4$, $f_5$ and $f_6$ of the six components as well as the lens separations $D_{2,1}$, $D_{3,2}$, $D_{4,3}$, $D_{5,4}$ and $D_{6,5}$ thereof. The relationship $D_{k,k-1}=f_k+d_{k,k-1}+f_{k-1}$, previously set forth follows directly from the illustration given in the drawing.

Fig. 1($a$) represents a normal or reference position in which the displacement $z$ of the movable set $L_1$, $L_3$, $L_5$ is zero, the image distance $x$ having its reference value $x_0$. In Fig. 1($b$) the movable set is displaced by $z$ and the interfocal spacings $d_{2,1}$, $d_{4,3}$ and $d_{6,5}$ as well as the lens separations $D_{2,1}$, $D_{4,3}$ and $D_{6,5}$ have been increased by the displacement $z$, which now has a finite value, whereas the interfocal spacings $d_{3,2}$, $d_{5,4}$ and the separations $D_{3,2}$, $D_{5,4}$ have been reduced by the same value $z$; the magnitude of $z$ in this figure is assumed to be such that full compensation does not occur, the image plane IP being therefore displaced by a small distance $-y$ from its reference position $IP_0$ so that $x=x_0-z+y$ in conformity with Equation 3. In Fig. 1($c$), finally, $z$ has its maximum value (assumed to be unity) and the image deviation $y$ is again zero, thus $x=x_0-1$.

With an object (not shown) positioned at infinity, the front lens $L_6$ will have an image plane through focal point $F_{6''}$. If the object's position is closer and equal to $u_6$, this image plane will not shift if lens $L_6$ is moved outwardly by $f_6^2/u_6$, e.g. as shown in dot-dash lines in Fig. 1($a$), hence the overall image plane IP will also remain stationary. Adjustment of the front lens will thus serve as a means for focusing the system irrespectively of the displacement $z$ of the movable set.

Figure 2:
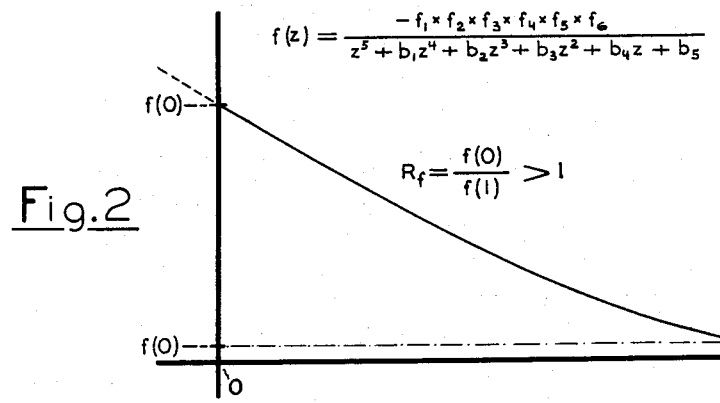
Fig. 2 is a graph illustrating the overall focal-length $f(z)$ plotted with respect to the displacement $z$, for a positively refracting six-element system of the character shown in Fig. 1.
Figure 3:
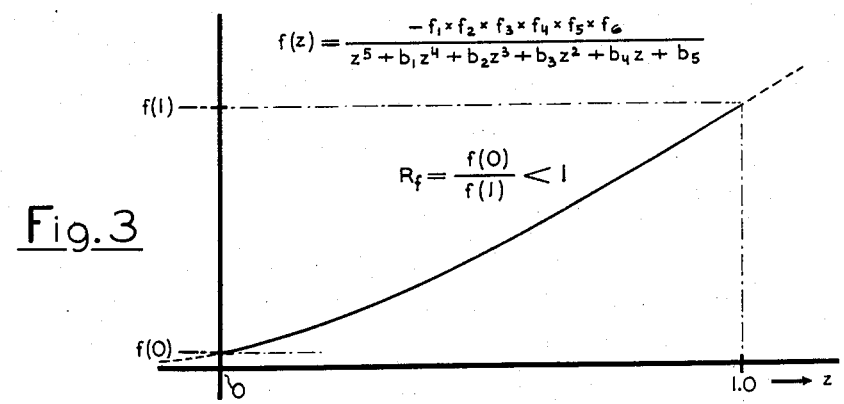
Fig. 3 is a graph similar to Fig. 2 but showing $f(z)$ for a negatively refracting six-element system according to Fig. 1.

An operative range of focal lengths has been illustrated in Fig. 2 for a positively refracting system according to Fig. 1; a similar operative range is shown in Fig. 3 for a negatively refracting system of this type.

Figure 4:
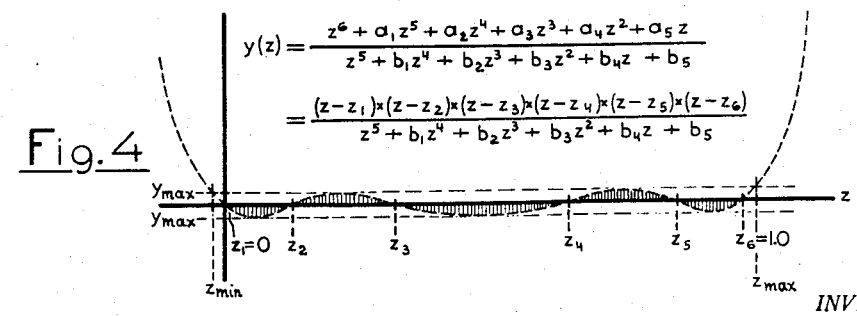
Fig. 4 is a graph illustrating the image deviation $y(z)$ for the system of Fig. 1.

Fig. 4 shows the image deviation $y$ as a function of the lens shift $z$. It will be seen that $y$ goes through zero at six points all within the operative range of the system whose limits for z are at or near the points 0 and 1. The curve is relatively flat between these two points so that the negative and positive peaks between the zeros are low. Below 0 and above 1, on the other hand, the values of $y$ rise sharply toward positive infinity.

It will be observed from Fig. 4 that $z$ may assume some values greater than unity and also some negative values without causing $y$ to exceed the magnitude of the peaks occurring between points of full compensation. The points at which $y$ reaches this magnitude have been indicated at $z_{min}$ and $z_{max}$; it will be understood that, if the operative range is to be thus extended, inequation (13a) should be modified by substituting "$z_{max}-z_{min}$" for "1", $z_{min}$ in the instant case being of negative sign.

Fig. 5 shows a five-element varifocal system in which the first, third and fifth components are negative lenses designated $NL_1$, $NL_3$ and $NL_5$; the second and fourth components are positive lenses designated $PL_2$ and $PL_4$. The same designations as in Fig. 1 have been used for the focal points, lens separations and focal lengths.

The varifocal system shown in Fig. 5 is negatively refracting and has its image plane IP ahead of front component $NL_5$. The final image of this system is upright and virtual. In order to adapt this varifocal system for use in a photographic objective, fixed supplemental lenses $SL_1$ and $SL_2$, flanking a diaphragm DP, have been provided back of member $NL_1$; the power of the last-mentioned lenses is such as to make the overall system positively refracting, with a real image plane at IP'. The deviation of plane IP' from a reference position, in response to displacements of the movable set $NL_3$, $NL_5$, will be equal to $M^2y$ where M is the magnification factor of the supplemental system $SL_1$, $SL_2$.

From the preceding mathematical analysis it will have become clear that the focal length of the front component, here designated $f_5$, may be varied almost at will, subject only to the limitation of inequation (13a) or (13b) of which solely the former is applicable in the present case. In Fig. 6 I have shown, accordingly, a system identical in all respects with that of Fig. 5 except that negative front lens $NL_5$ has been replaced by a positive front lens $PL_5$, the distance $D_{5,4}-f_5$ being the same. The final image of this system will be inverted and virtual. The position of the virtual image plane IP of the varifocal system and the position of the real focal plane IP' of the system supplemented by lenses $SL_1$ and $SL_2$ remains unchanged.

Following is a table giving, by way of example, suitable numerical values for the essential parameters of the systems of Figs. 5 and 6, including the focal lengths of lenses $L_1$ to $L_4$ and their separations $D_{4,3}$, $D_{3,2}$ and $D_{2,1}$, as well as the parameter $(D_{5,4}-f_5)$ which, as is readily apparent from Fig. 1, is identical with the sum of the two parameters $d_{5,4}$ and $f_4$. Focal length $f_5$, which is arbitrary, is to be taken as negative in the case of Fig. 5. A ratio of focal lengths $f_{min}:f_{max}=1:16$ has been assumed for these negatively refracting systems.

Table I

| Focal lengths | Variable separations | | Fixed separations |
|---|---|---|---|
| | | From — To | |
| $f_5$=arbitrary | $D_{5,4}(z) = D_{5,4}-z$ | $3.7375+f_5$ — $2.7375+f_5$ | $D_{5,3}=3.8201+f_5$ |
| $f_4=+1.1927$ | $D_{4,3}(z) = D_{4,3}+z$ | $0.0826$ — $1.0826$ | $D_{3,1} =1.1891$ |
| $f_3=-0.5761$ | $D_{3,2}(z) = D_{3,2}-z$ | $1.0891$ — $0.0891$ | $D_{4,2} =1.1717$ |
| $f_2=+0.8556$ | $D_{2,1}(z) = D_{2,1}+z$ | $0.1000$ — $1.1000$ | $D_{2,IP}=1.7440$ |
| $f_1=-0.8000$ | $D_{1,IP}(z) = D_{1,IP}-z$ | $-1.8440$ — $-2.8440$ | |

The foregoing table is reproduced in its entirety in Fig. 7.

Fig. 8 illustrates the operative range of the system of Figs. 5 and 6; the focal-length of ratio of 1/16.

Fig. 9 shows a graph for the image deviation $y$ as a function of the lens shift $z$ for the five-element systems of Figs. 5 and 6. The curve of $y(z)$ shows the chosen five zeroes in a range extending from $z_1$ to $z_5$; also, as explained in connection with Fig. 4, there are two points $z_{min}$ and $z_{max}$ beyond that range at which the magnitude of $y$ just begins to exceed its permissible limit, e.g. $\pm 0.005$ (based upon a numerical value of 1 for the maximum full-compensation lens shift $z_5$). It will be observed that this curve, in contradistinction to the one of Fig. 4, rises sharply toward negative infinity below $z_1=0$.

In Fig. 10 I have shown a varifocal system representing an inversion of the system of Fig. 5, the movable odd-numbered components being here represented by positive lenses $PL_1$, $PL_3$, $PL_5$ while the intervening fixed components are negative lenses $NL_2$, $NL_4$. The image plane IP of this varifocal system, which is positively refracting, is shown positioned at a distance $x$ behind the secondary focal point $F_1''$ of rear lens $PL_1$. The supplemental lens system $SL_1$ and $SL_2$ serves here to foreshorten the image distance, resulting in an image plane IP' to the left of plane IP.

It will be understood that front lens $NL_5$ in Fig. 5 and front lens $PL_5$ in Figs. 6 or 10 may be used for focusing as described in connection with lens $L_6$ of Fig. 1.

Following is a table giving, by way of example, suitable numerical values for the parameters of the system of Fig. 10. Again, the ratio of focal lengths $R_f=16:1$.

Table II

| Focal lengths | Variable separations | | Fixed separations |
|---|---|---|---|
| | | From — To | |
| $f_5$=arbitrary | $D_{5,4}(z) = D_{5,4}-z$ | $f_5-2.1924$ — $f_5-3.1924$ | $D_{5,3} =f_5-2.1157$ |
| $f_4=-0.9054$ | $D_{4,3}(z) = D_{4,3}+z$ | $0.0767$ — $1.0767$ | $D_{3,1} = 1.2541$ |
| $f_3=+0.8911$ | $D_{3,2}(z) = D_{3,2}-z$ | $1.1541$ — $0.1541$ | $D_{4,2} = 1.2308$ |
| $f_2=-0.5361$ | $D_{2,1}(z) = D_{2,1}+z$ | $0.1000$ — $1.1000$ | $D_{2,IP}= 3.5150$ |
| $f_1=+1.1000$ | $D_{1,IP}(z) = D_{1,IP}-z$ | $3.4150$ — $2.4150$ | |

The above table has been reproduced in its entirety in Fig. 11.

The operative range of the system of Fig. 10, represented by a varifocal ratio of $R_f=16$, has been illustrated in Fig. 12. Fig. 13 shows the course of the image shift $y$ of the system of Fig. 10 which is similar to that of the systems of Figs. 5 and 6 as plotted in Fig. 9, except that the spacing between the zeroes increases toward $z=0$ in Fig. 9 and toward $z=1$ in Fig. 13.

It will be understood that the varifocal system according to this invention may be used, if desired, in combination with an afocal lens system placed in front thereof, the performance of the varifocal system remaining unchanged by this addition.

I claim:

1. A varifocal optical lens system comprising five air-spaced components including a movable first component at the image side of the system, a stationary second component ahead of said first component, a movable third component ahead of said second component, a stationary fourth component ahead of said third component, and a movable fifth component at the object side of the system, the refractive powers of at least the first four of said components being of alternate sign; and means for axially displacing said movable first, third and fifth components at the same rate with respect to said second and fourth components; said system having an image distance $x$, measured between an image plane and the secondary focal point of said first component, equal to $x_0+z$ for five predetermined values $z_1$, $z_2$, $z_3$, $z_4$, $z_5$ of a variable $z$ representing the extent of displacement of said movable components from a reference position toward the image side of the system, $x_0$ being a constant, said image distance being increased by $\pm y$ for other values of $y$ where $y$ is an image deviation varying as a fifth-order polynomial of $z$ according to the relationship $$y = \frac{z^5 + a_1 z^4 + a_2 z^3 + a_3 z^2 + a_4 z}{z^4 + b_1 z^3 + b_2 z^2 + b_3 z + b_4}$$

the coefficients $a_1-a_4$ and $b_1-b_4$ of said polynomial satisfying a set of four equations $$a_1 = b_1 - x_0$$
$$a_2 = b_2 - x_0 b_1 + f_1^2$$
$$a_3 = b_3 - x_0 b_2 + f_1^2 c_1$$
$$a_4 = b_4 - x_0 b_3 + f_1^2 c_2$$

the values of $b_1$ to $b_4$ and $c_1$, $c_2$ being given in terms of the principal focal lengths $f_1$ to $f_4$ of said first through fourth components and of the interfocal spacings $d_{2,1}$ to $d_{5,4}$ of all of said components, measured from the secondary focal point of any higher-order component to the primary focal point of the nearest lower-order component, by the expressions $$b_1 = d_{2,1} - d_{3,2} + d_{4,3} - d_{5,4}$$
$$b_2 = -d_{2,1}d_{3,2} + d_{2,1}d_{4,3} - d_{3,2}d_{4,3} - d_{2,1}d_{5,4}$$
$$\qquad + d_{3,2}d_{5,4} - d_{4,3}d_{5,4} + f_2^2 + f_3^2 + f_4^2$$
$$b_3 = -d_{2,1}d_{3,2}d_{4,3} + d_{2,1}d_{3,2}d_{5,4} - d_{2,1}d_{4,3}d_{5,4} + d_{3,2}d_{4,3}d_{5,4}$$
$$\qquad + f_2^2 d_{4,3} + f_3^2 d_{2,1} + f_4^2 d_{3,2} + f_2^2 d_{5,4} + f_3^2 d_{5,4} + f_4^2 d_{2,1}$$
$$b_4 = d_{2,1}d_{3,2}d_{4,3}d_{5,4} + f_2^2 d_{4,3}d_{5,4} + f_3^2 d_{2,1}d_{5,4} + f_4^2 d_{2,1}d_{3,2}$$
$$c_1 = -d_{3,2} + d_{4,3} - d_{5,4}$$
$$c_2 = -d_{3,2}d_{4,3} + d_{3,2}d_{5,4} - d_{4,3}d_{5,4} + f_3^2 + f_4^2$$

and further satisfying the relationship $$R_f = (b_4 + b_3 + b_2 + b_1 + b)/b_4$$

wherein $R_f$ represents the varifocal ratio of the system.

2. A varifocal system according to claim 1 wherein said first and third components are negatively refracting, the varifocal ratio $R_f$ being substantially equal to 1:16, and wherein the focal lengths $f_1$ to $f_5$ and the separations $D_{2,1}-D_{5,4}$ of said components have numerical values, based upon a numerical value of unity for the operative range ($z_5$ to $z_1$) of the displacement $z$, substantially as given in the following table:

| Focal lengths | Variable separations | |
|---|---|---|
| | From | To |
| $f_5$=arbitrary | $D_{5,4}-z=(3.7375+f_5)$ | $(2.7375+f_5)$ |
| $f_4=+1.1927$ | $D_{4,3}+z=0.0826$ | 1.0826 |
| $f_3=-0.5761$ | $D_{3,2}-z=1.0891$ | 0.0891 |
| $f_2=+0.8556$ | $D_{2,1}+z=0.1000$ | 1.1000 |
| $f_1=-0.8000$ | | |

3. A varifocal system according to claim 1 wherein said first and third components are positively refracting, the varifocal ratio $R_f$ being substantially equal to 16:1, and wherein the focal lengths $f_1$ to $f_5$ and the separations $D_{2,1}$ to $D_{5,4}$ of said components have numerical values, based upon a numerical value of unity for the operative range ($z_5$ to $z_1$) of the displacement $z$, substantially as given in the following table:

| Focal lengths | Variable separations | |
|---|---|---|
| | From | To |
| $f_5$=arbitrary | $D_{5,4}-z=(f_5-2.1924)$ | $(f_5-3.1924)$ |
| $f_4=-0.9054$ | $D_{4,3}+z=0.0767$ | 1.0767 |
| $f_3=+1.8911$ | $D_{3,2}-z=1.1541$ | 0.1541 |
| $f_2=-0.5361$ | $D_{2,1}+z=0.1000$ | 1.1000 |
| $f_1=+1.1000$ | | |

References Cited in the file of this patent

UNITED STATES PATENTS

| | | |
|---|---|---|
| 2,159,394 | Meller et al. | May 23, 1939 |
| 2,165,341 | Capstaff et al. | July 11, 1939 |
| 2,179,850 | Glancy | Nov. 14, 1939 |
| 2,235,364 | Gramatzki | Mar. 18, 1941 |
| 2,454,686 | Bach | Nov. 23, 1948 |
| 2,566,485 | Cuvillier | Sept. 4, 1951 |
| 2,704,487 | Rosier | Mar. 22, 1955 |
| 2,718,817 | Bach et al. | Sept. 27, 1955 |
| 2,778,272 | Reymond | Jan. 22, 1957 |
| 2,782,684 | Hopkins | Feb. 26, 1957 |

FOREIGN PATENTS

| | | |
|---|---|---|
| 536,706 | Great Britain | May 23, 1941 |
| 1,081,948 | France | June 16, 1954 |